United States Patent
Vollert et al.

(10) Patent No.: US 8,380,412 B2
(45) Date of Patent: Feb. 19, 2013

(54) CONTROL DEVICES FOR A BOOSTER BRAKE SYSTEM OF A VEHICLE AND METHOD FOR OPERATING A BOOSTER BRAKE SYSTEM OF A VEHICLE

(75) Inventors: Herbert Vollert, Vaihingen/Enz (DE);
Remy Garnier, Remseck (DE);
Reinhard Weiberle, Vaihingen/Enz (DE); Timo Jahnz, Besigheim (DE);
Volker Mehl, Weingarten (DE); Frank Kneip, Bruchmühlbach-Miesau (DE);
Dirk Mahnkopf, Eglosheim (DE); Jens Kolarsky, Bietigheim/Bissingen (DE);
Stephan Hoenle, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/263,894

(22) PCT Filed: Feb. 9, 2010

(86) PCT No.: PCT/EP2010/051559
§ 371 (c)(1),
(2), (4) Date: Mar. 28, 2012

(87) PCT Pub. No.: WO2010/115646
PCT Pub. Date: Oct. 14, 2010

(65) Prior Publication Data
US 2012/0179345 A1 Jul. 12, 2012

(30) Foreign Application Priority Data
Apr. 9, 2009 (DE) .......................... 10 2009 002 315

(51) Int. Cl.
*G06F 7/70* (2006.01)

(52) U.S. Cl. ................ 701/70; 701/94; 60/534; 60/545; 60/547.1; 60/548; 60/550; 303/4; 303/52; 303/113.2; 303/113.3; 303/113.4; 188/72.4; 188/345; 137/627.5

(58) Field of Classification Search ............... 701/70, 701/94; 303/4, 52, 113.2, 113.3, 113.4, 114.1, 303/114.2, 114.3, 114.12, 116.1, 116.2, 122.08, 303/122.13; 60/534, 545, 547.1, 548, 550, 60/555, 578, 586, 588, 560, 562, 563, 567, 60/581, 582, 591, 593; 188/72.4, 345, 106 P; 137/627.5
See application file for complete search history.

(56) References Cited

U.S. PATENT DOCUMENTS
4,179,980 A * 12/1979 Kito et al. ..................... 91/6
(Continued)

FOREIGN PATENT DOCUMENTS
DE 10057557 12/2001
DE 10327553 1/2005
DE 102005024577 11/2006

OTHER PUBLICATIONS
PCT/EP2010/051559 International Search Report dated Aug. 13, 2010 (3 pages).

*Primary Examiner* — James P Trammell
*Assistant Examiner* — McDieunel Marc
(74) *Attorney, Agent, or Firm* — Michael Best & Friedrich LLP

(57) ABSTRACT

A control device (10) for a brake-power-assisted brake system of a vehicle having a first input device (26) for a supplied first information item (28) relating to a supplied assistance force (Fu) of a brake booster (14) of the brake-power-assisted brake system, a second input device (30) for a supplied second information item (32) relating to a total force (Fg) comprising the assistance force (Fu) and a driver braking force (FI) supplied by activation of an activation element (12) of the brake-power-assisted brake system, an evaluation device (36) which is configured to define a third information item relating to a proportional relationship between the total force (Fg) and the assistance force (Fu) taking into account the first information item (28) and the second information item (32), and an output device (44, 50) which is configured to supply at least one control signal (46, 52) to at least one component (14, 54) of the brake-power-assisted brake system taking into account the defined third information item relating to the proportional relationship between the total force (Fg) and the assistance force (Fu).

19 Claims, 4 Drawing Sheets

U.S. PATENT DOCUMENTS

| | | | |
|---|---|---|---|
| 4,244,186 A | * | 1/1981 | Mehren .......................... 60/560 |
| 4,840,436 A | * | 6/1989 | Burgdorf et al. ............ 303/113.2 |
| 5,607,209 A | * | 3/1997 | Narita et al. ............. 303/122.11 |
| 5,699,713 A | * | 12/1997 | Mortimer ..................... 91/369.2 |
| 5,938,297 A | * | 8/1999 | Whaite et al. .............. 303/114.3 |
| 6,161,903 A | * | 12/2000 | Dieringer ................... 303/114.1 |
| 6,568,182 B2 | | 5/2003 | Linden et al. |
| 2008/0238189 A1 | | 10/2008 | Kuo et al. |
| 2009/0115242 A1 | | 5/2009 | Ohtani et al. |

\* cited by examiner

CONTROL DEVICES FOR A BOOSTER BRAKE SYSTEM OF A VEHICLE AND METHOD FOR OPERATING A BOOSTER BRAKE SYSTEM OF A VEHICLE

BACKGROUND OF THE INVENTION

The invention relates to control devices for a booster brake system of a vehicle. The invention also relates to a method for operating a booster brake system of a vehicle.

In order to permit a driver of a vehicle to comfortably activate an activation element of a brake system such as, for example, a brake pedal, a brake system frequently has a brake booster. The brake system with a brake booster is often referred to as a booster brake system.

A brake booster is configured to supply an assistance force which, in addition to a driver braking force which is applied to the activation element by the driver, brings about braking of at least one wheel. Suitable brake boosters are described, for example, in DE 10 2005 024 577 A1, DE 10057 557 A1 and DE 103 27 553 A1.

However, in a conventional booster brake system, a functional failure or functional impairment of the brake booster or of a component which interacts with the brake booster can occur. In this case, the brake booster is generally no longer suitable for supplying a sufficiently strong assistance force. In such a situation, the driver must therefore apply a relatively large driver braking force to the activation element of the booster brake system. In particular, it may be the case here that the driver does not notice the restricted or failed functional capability of the brake booster until relatively late and therefore has to react very suddenly. It is therefore desirable to embody a brake booster in such a way that even in the case of a restricted or failed functional capability of the brake booster or a component which interacts with the brake booster a good level of driving comfort is ensured for the driver.

SUMMARY OF THE INVENTION

The invention provides a control device for a booster brake system of a vehicle, and a method for operating a booster brake system of a vehicle.

The present invention can be applied with a cost-effective brake system with a simple design. In particular, the invention is suitable for execution on a brake system having a mechanical coupling between the activation element, for example a brake pedal, and between the master brake cylinder. The improved reliability and a lower failure risk of the brake system are ensured by the mechanical coupling.

In particular, there is no need for any additional hardware for executing the methods according to the invention or for using the corresponding control devices. In order to determine the second information item relating to the total braking force, recourse is preferably made to a component which is already present on the vehicle. For example, the second information item relating to a pressure sensor of a brake control system such as, for example, an ABS system or an ESP system, can be determined. The first information item used can be at least one variable which describes the method of functioning of the brake booster and by means of which the brake booster is controlled via a controller. The first information item can in this case be supplied directly by the controller to the control device. In this way, the need to determine the first information item is eliminated.

In one preferred embodiment, it is possible to dispense with an activation element sensor system with a force sensor for directly measuring the driver's braking force and/or a travel sensor for measuring an adjustment travel, corresponding to the driver's braking force, of an adjustment component of the activation element. As a result, the adverse effects in terms of function, deceleration and/or comfort which are associated with the failure of the activation sensor system are eliminated. In particular, eliminating the activation element sensor system makes it possible to embody the brake system in a more cost-effective way and to achieve a saving in terms of installation space in the activation element.

Likewise, a functional failure of the activation element sensor system can be suppressed by means of the present invention without entailing adverse effects in terms of function, deceleration and/or comfort for the driver.

Furthermore, the present invention implements the possible way of bypassing a functional impairment of the brake booster by increasing the total braking torque by an amount equal to the additional braking torque (additional braking torque). The additional braking torque can be, for example, an additional brake pressure of a magnitude by which the total brake pressure is increased. The additional brake torque can also be, as an addition or as an alternative thereto, a braking torque of an ABS system, an EPS system, an electric actuator, an electromechanical actuator, an electric parking brake and/or a further brake component. The residual functionality of the booster brake system is increased through the supply of the additional braking torque.

A component of the booster brake system is to be understood as being a vehicle component which interacts with the brake system. The component of the booster brake system can, however, also be a vehicle component which does not contribute directly to the braking of at least one wheel. For example, the at least one component of the booster brake system is a brake booster, a device for outputting a warning and/or information, a fault memory, a transmitting unit, a navigation device, a vehicle radio, an electric parking brake or a brake control system.

Advantageous developments of the control devices according to the invention are described in the dependent claims. The advantages of the control devices according to the invention are also ensured in a booster brake system with a control device according to the invention or in a vehicle having such a booster brake system.

In addition, developments of the method according to the invention for operating a booster brake system of a vehicle in accordance with the developments of the control devices according to the invention are possible.

BRIEF DESCRIPTION OF THE DRAWINGS

Further features and advantages of the present invention are explained below with reference to the figures, of which.

DETAILED DESCRIPTION

Figure 1:
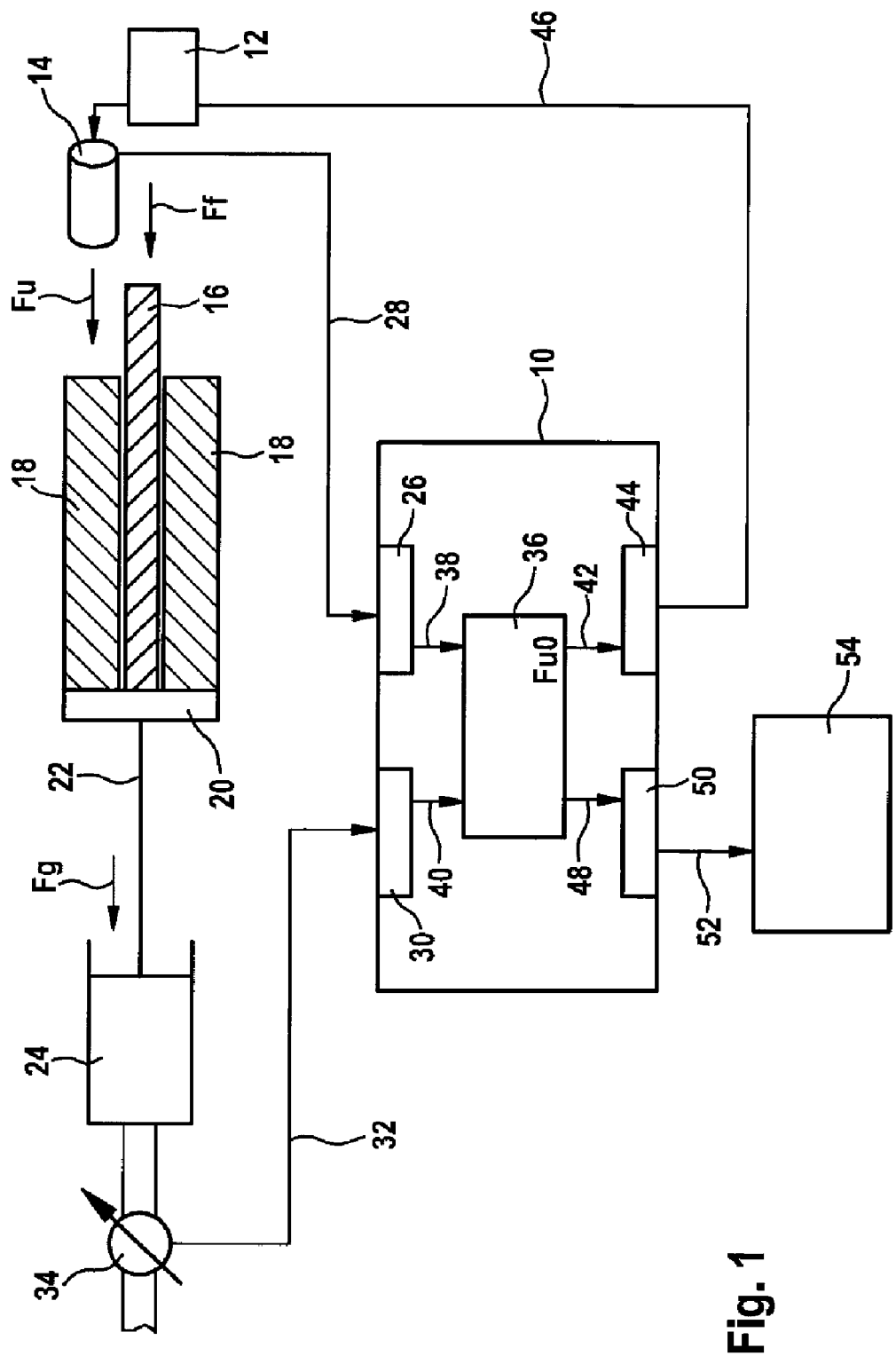
FIG. 1 is a schematic illustration of a first embodiment of the control device.

FIG. 1 is a schematic illustration of a first embodiment of the control device.

The schematically represented control device 10 is used in a vehicle with a booster brake system. The booster brake system (only partially illustrated) has an activation element 12 such as, for example, a brake pedal. By means of the activation element 12, a driver can activate the brake system in order to brake at least one wheel of the vehicle using the control device 10. In this context, the driver applies a driver braking force Ff to the activation element 12.

In order to relieve the driver of work during braking of the vehicle, the brake system is additionally equipped with a brake booster 14. The brake booster 14 is configured to supply an (additional) assistance force Fu for braking the vehicle. The brake booster 14 can be, for example, an electromechanical brake booster, an electric brake booster or a hydraulic brake booster. It is to be noted that the application of the control device 10 is not restricted to a specific type of brake booster 14, and other exemplary embodiments of the brake booster 14 can therefore likewise be used. Furthermore, a plurality of brake boosters 14 can also be used to supply the assistance force Fu.

The activation element 12 and the brake booster 14 are arranged in the brake system in such a way that the driver braking force Ff and the assistance force Fu interact as a total braking force Fg, wherein, in particular, the following can apply:

$$Fg = Ff + Fu \quad \text{(Eq. 1)}$$

Even if the equation (Eq. 1) is used as the basis below, for a person skilled in the art it is, however, obvious from the following sentences that the described method can also be executed with the total braking force Fg which also comprises at least one further force.

For this purpose, the activation element 12 and the brake booster 14 can be coupled to a common coupling element 20 which passes on the total braking force Fg. In the illustrated embodiment, the activation element 12 is coupled via an input piston 16, and the brake booster 14 is coupled via an assistance piston 18, to a coupling element 20 which is embodied as a reaction plate. The input piston 16 and the assistance piston 18 are arranged on the input side of the coupling element 20. In this case, the total braking force Fg acts on an output piston 22 which is arranged on the output side of the coupling element 20. The total braking force Fg is therefore supplied on the output side by the activation element 12 and the brake booster 14.

Of course, it is also possible to use the control device 10 with a booster brake system without a coupling element 20 which is embodied as a reaction plate. As the following description suggests to a person skilled in the art, the control device 10 can also be used with a different coupling mechanism.

The total braking force Fg which results from the forces Ff and Fu preferably acts on a force/pressure conversion element in such a way that in the case of a total braking force Fg which is not equal to zero a change in pressure takes place in at least one closed brake circuit which is filled with a braking medium. In the illustrated embodiment, the output piston 22 acts with the total braking force Fg on a displaceable side of a master brake cylinder 24. A total braking force Fg which is directed away from the coupling element 20 and which is not equal to zero can therefore be converted by means of the master brake cylinder 24 into an increase in a pressure p in the interior of the brake circuit. For the pressure p in the interior of the brake circuit the following applies:

$$p = Fg/A \quad \text{Eq. 2}$$

where A corresponds to an area of the master brake cylinder 24 or of some other force/pressure conversion element.

The increase in the pressure p in the interior of the brake circuit leads to an increased brake pressure in at least one wheel brake cylinder (not outlined) which is connected to the brake circuit. In this way, a wheel which is assigned to the at least one wheel brake cylinder is braked.

It is to be noted that embodying the brake system with the master brake cylinder 24 or as a hydraulic system with the closed brake circuit which is filled with a brake fluid or with a brake gas is advantageous for using the control device 10 but not necessary.

More details will be given below on the design and the method of functioning of the control device 10.

The control device 10 has a first input device 26 which is configured to receive a supplied first information item 28 relating to the assistance force Fu. The first information item 28 can be, for example, the assistance force Fu which is measured by a force sensor (not outlined). Likewise, the first information item 28 can be a variable, corresponding to the assistance force Fu, for describing a method of functioning of the brake booster 14. In an electromechanical or electric brake booster 14, the first information item 28 comprises, for example, a motor current, a motor torque and/or a motor position of a motor (not illustrated) of the brake booster 14. As an alternative or in addition thereto, the first information item 28 can also contain a temperature in the interior of the brake booster 14. If the brake booster 14 is embodied as a hydraulic brake booster, the first information item 28 can comprise a pressure value. Further examples of a variable which corresponds to the assistance force Fu and which has the purpose of describing a method of functioning of the brake booster 14 are obvious to a person skilled in the art and are therefore not enumerated.

A second input device 30 of the control device 10 is configured for receiving a supplied second information item 32 relating to the total braking force Fg. The second information item 32 preferably comprises a pressure p which is measured by at least one pressure sensor 34 which is arranged on the output side of the force/pressure conversion element. The at least one pressure sensor 34 can be an admission pressure sensor, a wheel pressure sensor and/or a circuit pressure sensor. For example, the pressure p in the interior of the master brake cylinder 24, in the interior of the brake circuit and/or upstream of the assembly can be determined by means of the at least one pressure sensor 34. In a preferred embodiment, the at least one pressure sensor 34 is additionally used for an ABS (anti-lock braking system) system and/or for an ESP system (electronic stability program, electronic stability control). By virtue of the multifunctionality of the at least one pressure sensor 34, a cost-effective embodiment of the control device 10 is possible. Of course, the at least one pressure sensor 34 can also be a secondary unit in a housing of the control device 10. As an alternative or as an additional element to the pressure p, the second information item 32 can also contain the total braking force Fg. In this case, the total braking force Fg is measured directly by means of a force sensor and is supplied to the control device 10.

The first input device 26 is configured to supply a signal 38, corresponding to the first information item 28, to an evaluation device 36 of the control device 10. The second input device 30 is correspondingly coupled to the evaluation device 36 in such a way that a signal 40 which corresponds to the second information item 32 can be passed onto the evaluation device 36.

The first input device 26 and/or the second input device 30 can also be embodied as inputs of the evaluation device 36 to which an internal sensor of the control device 10 supplies the information item 28 or 32. Further embodiment possibilities for the first input device 26 and the second input device 30 are obvious to a person skilled in the art. An information item 28 and/or 32 and/or at least one information item of a signal 38 and/or 40 can be a filtered information item. In one preferred embodiment, the first input device 26 and/or the second input device 30 comprises at least one filter.

The evaluation device 36 is configured to define a third information item relating to a proportional relationship between the total braking force Fg and the assistance force Fu. The third information item is defined taking into account the first information item 28 and the second information item 32. The proportional relationship can also specify a functional relationship between the driver braking force and the assistance force Fu here.

In the illustrated embodiment, the evaluation device 36 is configured to determine a difference between the total braking force Fg and the assistance force Fu as a proportional relationship. The difference between the total braking force Fg and the assistance force Fu is then defined as a (probable) driver braking force Ff. If the first information item 28 contains the assistance force Fu and the second information item 32 contains the total braking force Fg, the (probable) driver braking force Ff can be determined according to the following equation (Eq. 3):

$$Ff = Fg - Fu \qquad (Eq. 3)$$

Correspondingly, if the pressure p which is determined by the pressure sensor 34 is supplied as the second information item 32 to the control device 10, the (probable) driver braking force Ff can be defined according to the following equation (Eq. 4):

$$f = A \times p - Fu, \qquad (Eq. 4)$$

where the area A of the force/pressure conversion element is stored in the evaluation device 36.

The evaluation device 36 is therefore configured to determine the (probable) driver braking force Ff on the basis of the assistance force Fu and the total braking force Fg, and/or on the basis of the assistance force Fu and the pressure p. The braking request to the driver can therefore be easily determined by means of the control device 10. More details will be given below on two particularly advantageous application examples of the use of the (probable) driver braking force Ff which is determined by the evaluation device 36.

Conventionally, the driver braking force Ff is determined by an activation element sensor system. A suitable activation element sensor system comprises a force sensor for directly measuring the driver braking force Ff and/or travel sensor for measuring adjustment travel of an adjustable component of the activation element 12 and/or an adjustable component which is coupled to the activation element 12 (the adjustment travel which is measured by the travel sensor corresponds to the driver braking force Ff).

The arrangement of the activation element sensor system near to the activation element 12 is frequently difficult to implement. Furthermore, there is a risk of the activation element sensor system failing and therefore determination of the driver braking force Ff by the activation element sensor system no longer being possible.

The use of the control device 10 makes it possible to dispense with a conventional activation element sensor system for determining the driver braking force Ff. The costs for the activation element sensor system and the problems involved in the attachment of the activation element sensor system to the activation element 12 are therefore dispensed with.

In one preferred embodiment, the vehicle is equipped with a control device 10 as an addition to the activation element sensor system, and this is in order to bridge a functional failure of the activation element sensor system and the control device 10. The control device 10 can therefore be used as a backup in the event of failure of the activation element sensor system.

In the illustrated embodiment, the evaluation device 36 is additionally configured to define a setpoint assistance force Fu0 taking into account the specific (probable) driver braking force Ff. (The setpoint assistance force Fu0 therefore corresponds to a difference between the total braking force Fg and the assistance force Fu).

In this context, the setpoint assistance force Fu0 is to be a function f of the driver braking force Ff:

$$Fu0 = f(Ff) \qquad (Eq. 5)$$

In particular the following can apply:

$$Fu0 = c(Ff) \times Ff, \qquad (Eq. 6)$$

where c(Ff) is a function for boosting the driver braking force Ff. The function c(Ff) can be, for example, a constant factor γ (Eq. 7) or a mapping (Eq. 8).

$$c(Ff) = \gamma \qquad (Eq. 7)$$

$$c: Ff \rightarrow [0, C_{max}] \qquad (Eq. 8)$$

where $c_{max}$ is the maximum boosting factor. Values which are preferred by the manufacturer can be predefined as a constant factor γ or numerical values of the mapping c(Ff). The definition of the setpoint assistance force Fu0 taking into account the driver braking force Ff which is defined by the evaluation device 36 is not restricted to a specific function c(Ff).

Likewise, the setpoint assistance force Fu0 can be defined directly taking into account the total braking force Fg and the assistance force Fu. For example the following applies:

$$Fu0 = \gamma \times (Fg - Fu), \text{ or} \qquad (Eq. 9)$$

$$Fu0 = \gamma \times (A \times p - Fu), \text{ or} \qquad (Eq. 10)$$

$$Fu0 = c(Fg - Fu) \times (Fg - Fu), \text{ or} \qquad (Eq. 11)$$

$$Fu0 = c(A \times p - Fu) \times (A \times p - Fu). \qquad (Eq. 12)$$

As a result, a setpoint assistance force Fu0 which corresponds to the driver braking force Ff can be defined without the activation element sensor system or by bypassing the failed activation element sensor system. The setpoint assistance force Fu0 which is defined by the evaluation device 36 can be output as a value signal 42 to a first output device 44 of the control device 10. The first output device 44 is configured in this case to output a first control signal 46 to the defined setpoint assistance force Fu0 or a variable corresponding to the setpoint assistance force Fu0 such as, for example, a setpoint motor current, a setpoint motor torque a setpoint motor position and/or a setpoint temperature, to the brake booster 14.

The brake booster 14 can be actuated by means of the control signal 46 in such a way that an assistance force Fu which corresponds to the setpoint assistance force Fu0 can be supplied by the brake booster 14 by means of the conventional open-loop and closed-loop control strategies. In this case, the setpoint assistance force Fu0 can always be updated by using the assistance force Fu which is applied by the brake booster 14 itself. The brake booster 14 which is controlled by the control device 10 is therefore suitable for providing brake force assistance which can be regulated/set.

Although the braking request to the driver can no longer be detected directly with conventional methods after a failure of the activation element sensor system, it is possible to maintain the function of the brake booster 14 by means of the control device 10. The failure of the activation element sensor system therefore does not lead to a failure of the residual functionality of the brake system. This is an advantage over the automatic switching off of the brake booster 14 which conventionally takes place when the activation element sensor system fails, after which switching off the drive has to apply the total braking force Fg, required for braking, as driver braking force Ff to the activation element.

In one alternative embodiment, instead of the setpoint assistance force Fu0 it is also possible to output the specific (probable) driver braking force Ff from the control device 10 to the brake booster 14. In this case, the brake booster 14 is configured to determine the setpoint assistance force Fu0 as a function of the supplied (probable) driver braking force Ff.

Furthermore, the evaluation device 36 can also be configured to compare the determined (probable) driver braking force Ff with at least one comparison value. If the evaluation device 36 determines here that a deviation of the (probable) driver braking force Ff from the at least one comparison value is greater than a predetermined deviation limit, the evaluation device 36 outputs a corresponding comparison signal 48 to a second output device 50 of the control device 10. The deviation limit can also be put to zero. In this case, a comparison of the deviation with the deviation limit is eliminated. Furthermore, the deviation limit can be predefined as a function of a vehicle state, a vehicle operation and/or an ambient state.

The second output device 50 is preferably configured to output a second control signal 52 to a device 54 for outputting a warning and/or information. It is therefore possible to output to the driver a warning message or fault message by means of the device 54 for outputting a warning and/or information. The driver is therefore provided with the possibility of looking for a workshop to have the brake system checked.

The device 54 for outputting a warning and/or information can comprise, for example, a sound output device, a warning light and/or a display device. The device 54 for outputting a warning and/or information, which is used for the fault monitoring, can preferably also be used for at least one further function. The device 54 for outputting a warning and/or information is preferably a display device of a dashboard, a car radio and/or a navigation device.

Furthermore, at the same time as the bypassing of the failed activation element sensor system using the device 54 for outputting a warning and/or information, the driver can be informed about the failure of the activation element sensor system.

As an alternative or in addition thereto, the second output device 50 can also be configured to store a fault message in a fault memory. Likewise, the second output device 50 can be configured to actuate a transmission device in such a way that a fault message is sent to a workshop. This facilitates the detection of the cause of a fault and therefore permits more cost-effective remedying of the fault.

In one development, the control device 10 can be configured to determine a cause of a fault after at least one excessively large deviation of the (probable) driver braking force Ff from the at least one comparison value has been detected. More details are given below on possible ways of determining the cause of a fault taking into account at least one value which is determined by the evaluation device 36.

Figure 2:
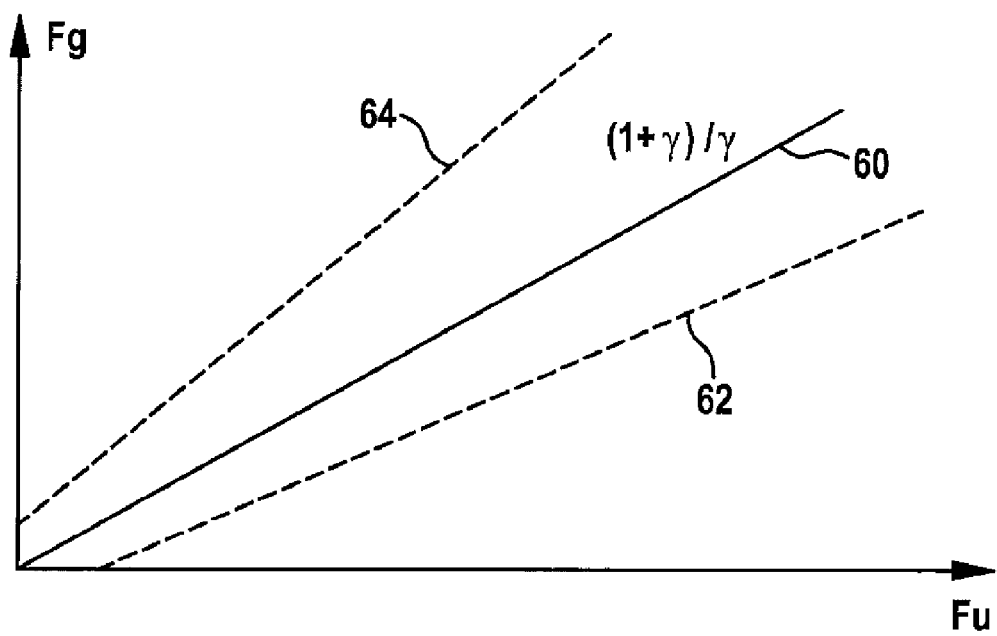
FIG. 2 shows a coordinate system for representing a second embodiment of the control device.

FIG. 2 shows a coordinate system for representing a second embodiment of the control device. The abscissa of the coordinate system indicates a value range of the assistance force Fu which can be supplied to a first input device of the control device. The ordinate corresponds to a value range for the total braking force Fg which can be supplied to a second input device of the control device.

In the brake system (not outlined) which interacts with the control device in FIG. 2, the setpoint assistance force Fu0 is predefined to the brake booster as a function of the driver braking force Ff:

$$Fu0=f(Ff)=c(Ff)\times Ff \qquad (Eq.\ 5)$$

In the text which follows, a closed-loop and open-loop control strategy which is easy to implement is used as the basis, in which strategy the following applies:

$$Fu0=\gamma\times(Fg-Fu)=\gamma\times Ff, \qquad (Eq.\ 9)$$

where γ is a constant factor. However, it is to be noted that the present invention is not restricted to checking for compliance with the setpoint assistance force Fu0 in this closed-loop and open-loop control strategy which is easy to implement. Instead, in a computationally less complex closed-loop and open-loop control strategy the control device can also check compliance with the setpoint assistance force Fu0 by the brake booster. Merely for the purpose of simplifying the following description, it is assumed by way of example that the setpoint assistance force Fu0 is predefined in accordance with equation (Eq. 9).

If the equation (Eq. 9) is inserted into the equation (Eq. 1), the following setpoint relationship is obtained between the total braking force Fg and the assistance force Fu:

$$Fg=(1+\gamma/\gamma)\times Fu \qquad (Eq.\ 13)$$

The setpoint relationship of the equation (Eq. 13) is complied with if the assistance force Fu which is applied by the brake booster is equal to the predefined setpoint assistance force Fu0. The evaluation device of the control device in FIG. 2 checks this.

For this purpose, the evaluation device compares a total braking force Fg supplied for an assistance force Fu with the straight line 60 indicated in FIG. 2. The straight line 60 has a gradient of (1+γ)/γ, which corresponds to the optimum quotient of the total braking force Fg by the assistance force Fu. (As an alternative to this the evaluation device can also calculate the quotient of the total braking force Fg by the assistance force Fu and compare it with a setpoint quotient equal to (1+γ)/γ).

In this way, the evaluation device checks whether the value pair composed of the total braking force Fg and the assistance force Fu is located within a range between a minimum tolerance band 62 and a maximum tolerance band 64. The tolerance bands 62 and 64 can be permanently predefined. In one development, at least one of the tolerance bands 62 or 64 can be predefined in a situation-dependent fashion. For example, the gradient of a tolerance band 62 or 64 is defined by a vehicle state/a method of functioning of the vehicle such as a vehicle speed and/or an ambient situation, for example a temperature.

Furthermore, at least one second pair of tolerance bands 62 and 64 can be predefined. For example, the first pair of tolerance bands 62 and 64 defines a first intermediate region in which the value pairs which are to be assessed as non-suspicious are located. A second pair of tolerance bands 62 and 64 can define a relatively large second intermediate region which corresponds to the value pairs which are considered as non-errored.

If at least one value pair is determined which deviates significantly from the straight line 60 and/or is errored, the evaluation device is configured to detect a functional impairment of the brake system. The evaluation device subsequently passes on a corresponding fault message to the output device.

The output device is configured such that on reception of the fault message it outputs the control signal to a fault memory, to a device for outputting a warning and/or information and/or to a transmitting device. In addition, the brake system can be placed in a fallback level by the control signal. This ensures the advantages already described above.

Furthermore, the control device can be configured such that after detection of the functional impairment of the brake system it determines a cause of a fault, as is described in more detail below.

In one development, the evaluation device is additionally configured to define an additional braking torque, for example an additional brake pressure, after the functional impairment of the brake system has been detected. The additional braking torque is preferably defined taking into account the proportional relationship between the total force and the assistance force in such a way that the functional impairment of the brake system is compensated and the total braking torque which is requested by the driver by means of the predefinition of the driver braking force is applied to at least one wheel of the vehicle. In this case, the output device is configured to actuate an additional brake component such as, for example, an electric actuator, an electromechanical actuator, an electric parking brake and/or a brake control system in such a way that a total braking torque, for example a total brake pressure, of the booster brake system is increased by an amount equal to the additional braking torque. The brake control system is preferably an ESP system and/or an ABS system.

As is apparent to a person skilled in the art on the basis of the paragraphs above, the present invention can also be implemented if, instead of the assistance force Fu and/or instead of the total braking force Fg, at least one corresponding first information item and/or second information item are/is supplied to the control device.

Figure 3:
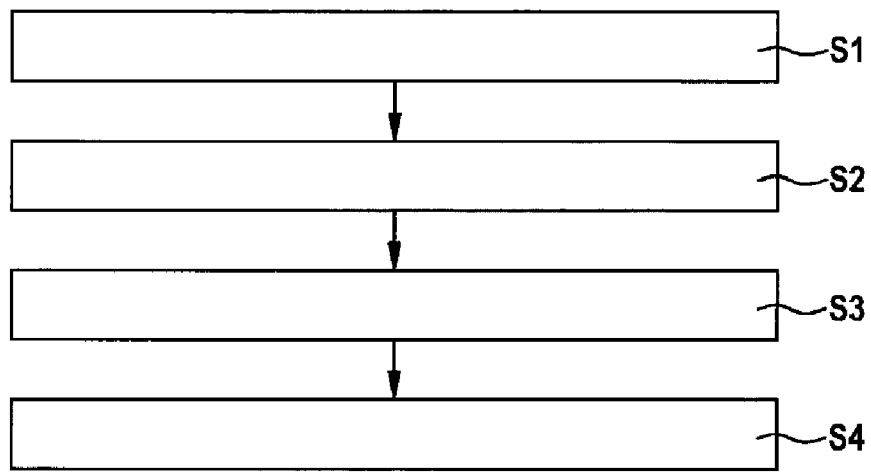
FIG. 3 is a flowchart representing a first embodiment of the method.

FIG. 3 shows a flowchart for representing a first embodiment of the method.

In a method step S1, a first information item relating to an assistance force of a brake booster of the booster brake system is determined. The first information item can comprise, for example, the assistance force, a motor current, a motor torque, a motor position, a temperature, a pressure value and/or a corresponding variable which represents a method of functioning of the brake booster.

In a further method step S2, a second information item relating to a total braking force is determined from the assistance force and from a driver braking force. The driver braking force is to be understood as being a force which the driver applies directly by activating an activation element of the booster brake system in order to brake the wheels. The activation element is, for example, a brake pedal. The driver braking force preferably corresponds to the force with which the driver adjusts an adjustable component of the activation element and/or a pressure which is applied to the activation element by the driver. The second information item preferably comprises the total braking force and/or the brake pressure in the brake circuit.

It is to be noted that the numbering of the method steps S1 and S2 does not define a chronological sequence of the method steps. For example, the method step S2 can also be carried out before the method step S1.

In a subsequent method step S3, a third information item relating to a proportional relationship between the total braking force and the assistance force taking into account the first information item and the second information item is defined. The third information item relating to the proportional relationship is, for example, a difference between the total braking force and the assistance force and/or a quotient of the total braking force and the assistance force.

In particular, the specific difference in the method step S3 can be defined as (probable) driver braking force. In addition, in the method step S3 it is possible to define a setpoint assistance force on the basis of the (probable) driver braking force. More details are not given here on further exemplary embodiments which are obvious to a person skilled in the art and have the purpose of using the defined (probable) driver braking force which can be implemented in the method step S3.

As an alternative or in addition thereto, the specific proportional relationship can be compared with a setpoint proportional relationship such as, for example, a setpoint driver braking force and/or a setpoint quotient. Further examples of the comparison of the specific proportional relationship with the setpoint proportional relationship are given above.

In one development, it is additionally possible in method step S3 to determine or reject a cause of a fault while taking into account the comparison of the specific proportional relationship with the setpoint proportional relationship:

For example it is detected that the proportional relationship between the forces Fg and Fu is correct up to a limiting value and starting from the limiting value said proportional relationship deviates from the setpoint proportional relationship, wherein starting from the limiting value the assistance force/the motor position is too high compared to the total braking force/the brake pressure. Starting from a specific assistance force Fu, there is therefore no, or virtually no, movement of the motor of the brake booster anymore. This means that the motor and/or the transmission of the brake booster are stuck. The motor and/or the transmission are/is also referred to as being jammed in this context.

If it is detected that an increase in the assistance force/a movement of the motor of the brake booster does not bring about an increase in the total braking force/the pressure in the brake circuit, it can be assumed that there is a leak in the hydraulic system. In this case, a test can be carried out to check the hydraulic system.

Furthermore, the motor of the brake booster may be damaged. This is detected from the fact that the assistance force/the motor position is too low compared to the total braking force/the brake pressure. If the motor applies too much force, the assistance force/the motor position is continuously too high compared to the total braking force/the brake pressure.

Depending on the cause of the fault, the brake system can be placed in a fallback level and/or a degree of severity of the cause of the fault can be assessed in the method step S3. In this way, it is possible to weight the fault message.

Additionally or alternatively it is possible in method S3 to define an additional braking torque, for example an additional brake pressure, taking into account the proportional relationship between the total force and the assistance force. The additional braking torque is preferably defined in such a way that a functional impairment which is detectable by means of the determined proportional relationship, can be compensated in at least one component of the brake system.

In a subsequent method step S4, at least one component of the booster brake system is controlled taking into account the defined third information item. For example, a brake booster is actuated in such a way that it complies with the setpoint assistance force defined in the third method step S3. As an alternative or in addition thereto, a device for outputting a warning and/or information can also be activated, while taking into account the comparison of an actual proportional relationship with a setpoint proportional relationship, in order to output sound and/or display images to the driver. Furthermore, a fault message, a cause of a fault and/or a fault weighting can be stored on a fault memory and/or transmitted via a transmitting device.

If the third information item comprises the additional braking torque, at least one brake component of the booster brake system is actuated in the method step S4 in such a way that a total braking torque of the booster brake system is increased by an amount equal to the additional braking torque. In this context, an electric actuator, an electromagnetic actuator, an electric parking brake and/or a brake control system such as, for example, an ESP system and/or an ABS system, are preferably actuated. As an alternative or in addition to the brake components enumerated here, another brake component, which is configured to change/shift volumes in the brake circuit of the booster brake system, can also be actuated in order to increase the total braking torque by an amount equal to the additional braking torque.

Figure 4:
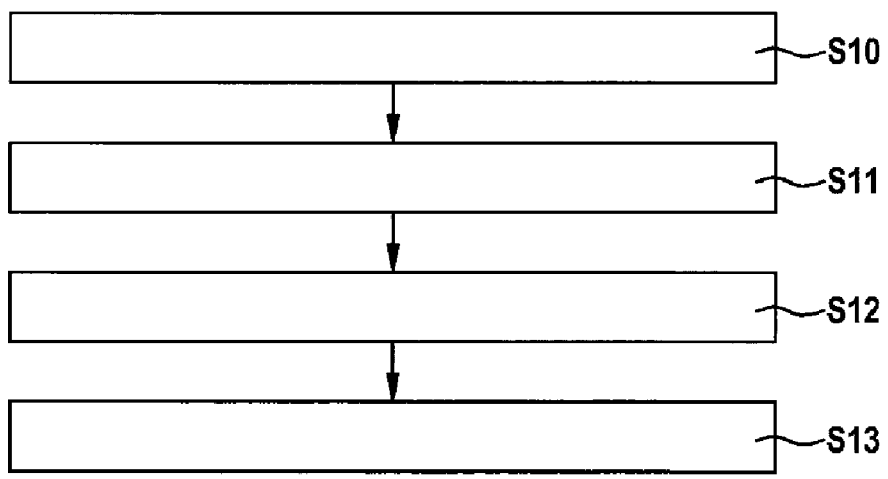
FIG. 4 is a flowchart representing a second embodiment of the method.

FIG. 4 shows a flowchart illustrating a second embodiment of the method.

In a first method step S10, a variable relating to an assistance force which is applied by a brake booster of a booster brake system is determined. The variable can comprise, for example, the assistance force and/or a motor current, a motor torque, a motor position, a temperature and/or a pressure value of the brake booster. (The method step S10 can correspond to the method step S1).

The determined variable relating to the assistance force is subsequently compared with at least one setpoint variable relating to the assistance force (method step S11). The setpoint variable is preferably a setpoint assistance force, a setpoint motor current, a setpoint motor torque, a setpoint motor position, a setpoint temperature and/or a setpoint pressure value.

If during the comparison of the determined variable with the setpoint variable it is detected that a difference between the variable and the setpoint variable is greater than a predefined deviation limit, in a subsequent method step S12 an additional braking torque, for example an additional brake pressure, which corresponds to the difference is defined. The additional braking torque is preferably defined in such a way that after the additional braking torque has been applied a preferred/advantageous total braking torque acts on at least one of the wheels of the vehicle.

In particular, in the method step S12 a difference $\Delta F$ between the assistance force Fu and the setpoint assistance force Fu0 can firstly be determined:

$$\Delta F = Fu0 - Fu \quad \text{(Eq. 14)}$$

An additional brake pressure $\Delta p$ can be subsequently determined as an additional braking torque from the difference $\Delta F$ and an area A of a force/pressure conversion element according to the equation (Eq. 15):

$$\Delta p = \Delta F / A \quad \text{(Eq. 15)}$$

In a further method step S13, a total braking torque of the booster brake system is increased by an amount equal to the additional braking torque (the additional brake pressure $\Delta p$). This is preferably done by actuating a brake component which is configured to change volume, displace volume and/or change braking torque in the brake circuit of the booster brake system. For example, an electric actuator, an electromechanical actuator, an electric parking brake or a brake control system, preferably an ESP system and/or an ABS system, is actuated in such a way that the additional braking torque is set. The residual functionality of the brake system is increased by raising the total brake pressure by an amount equal to the additional braking torque.

If, for example, an ESP system is used, at least one circuit pressure can be increased by an amount equal to the additional brake pressure $\Delta p$ by virtue of the fact that the return pump and the switching valve are corresponding used. Since the arrangement and the method of functioning of a return pump and of a switching valve over a return system are known to a person skilled in the art, more details are not given thereon here.

By means of the method described here, a preferred total braking torque is obtained despite a functional impairment of the brake system and without the driver braking force being additionally applied by the driver. This ensures a reliable method of braking of the brake system.

In particular, in an optional method step after detection that the difference between the variable and the setpoint variable is greater than the predefined deviation limit, a fault message can be output to the driver by means of a device which outputs a warning and/or information. The driver can therefore look for a workshop and have the brake system examined.

As an alternative or in addition to the optional method step described above, the cause of a fault can also be investigated after it has been detected that the difference between the variable and the setpoint variable is greater than the predefined deviation limit. Since possible ways of determining the cause of a fault have already been given above, more details are not given here.

Figure 5:
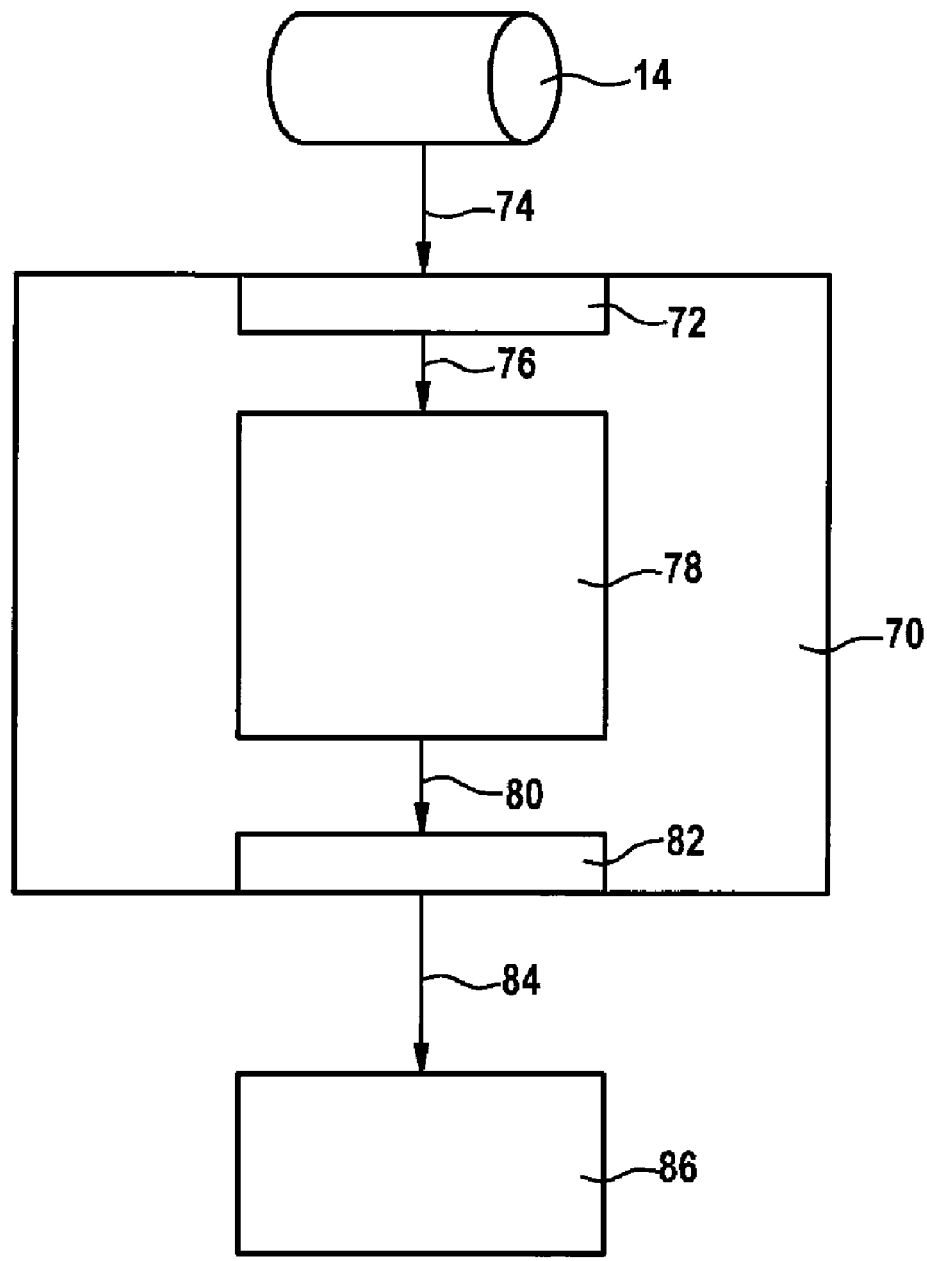
FIG. 5 is a schematic illustration of a third embodiment of the control device.

FIG. 5 is a schematic illustration of a third embodiment of the control device.

The illustrated control device 70 for a booster brake system of a vehicle comprises an input device 72 for receiving an input signal 74 with a supplied variable relating to an assistance force of a brake booster 14 of the booster brake system (only partially outlined). The supplied variable comprises, for example, the assistance force, a motor current, a motor torque, a motor position, a temperature, a pressure value and/or a corresponding variable which represents a method of functioning of the brake booster 14.

The input device 72 outputs a signal 76, corresponding to the supplied variable, to an evaluation device 78 of the control device 70. The output device 78 is configured to compare the received variable (or the signal 76) relating to the assistance force with a predefined setpoint variable relating to the assistance force. The setpoint variable can be stored on the evaluation device 78. Likewise, the setpoint variable can be supplied taking into account a vehicle state/a method of functioning of the vehicle and/or an ambient situation. If the evaluation device 78 detects that a difference between the variable and the setpoint variable is greater than a predefined deviation limit, the evaluation device 78 is additionally configured to define an additional braking torque corresponding to the difference. For example, this is done by means of the equations (Eq. 14) and (Eq. 15) which are specified above. The additional braking torque is subsequently supplied as a braking torque signal 80 to an output device 82.

The output device 82 is configured to actuate at least one brake component 86 by means of at least one control signal 84 while taking into account the defined actual braking torque, in such a way that a total braking torque of the booster brake system is increased by an amount equal to the additional braking torque. The brake component 86 is configured for a change in volume/displacement of volume and/or a change in braking torque in the brake circuit of the booster brake system. An electric actuator, an electromechanical actuator, an electric parking brake and/or a brake control system are preferably actuated as the brake component 86. The brake component 86 can comprise, for example, an ESP system and/or an ABS system.

In this way, the advantages described above are ensured. The control device 70 can additionally be configured such that, after detection of a difference which is greater than the predefined deviation limit, it carries out a fault investigation, a fault weighting and/or advises the driver about the occurrence of a functional impairment on the brake system. Since corresponding developments of the control device 70 are obvious to a person skilled in the art by virtue of the descriptions above, more details thereon are not given here.

The invention claimed is:

1. A control device (10) for a booster brake system of a vehicle, comprising:
   a first input device (26) which is configured to receive a supplied first information item (28) relating to a supplied assistance force (Fu) of a brake booster (14) of the booster brake system;
   a second input device (30) which is configured to receive a supplied second information item (32) relating to a total force (Fg) composed of the assistance force (Fu) and a driver braking force (Ff) supplied by actuation of an activation element (12) of the booster brake system;
   an evaluation device (36) which is configured to define a third information item relating to a proportional relationship between the total force (Fg) and the assistance force (Fu) taking into account the first information item (28) and the second information item (32); and
   an output device (44, 50) which is configured to supply at least one control signal (46, 52) to at least one component (14, 54) of the booster brake system taking into account the defined third information item relating to the proportional relationship between the total force (Fg) and the assistance force (Fu).

2. The control device (10) as claimed in claim 1, wherein the evaluation device (36) is configured to define, as at least part of the third information item, a difference between the total force (Fg) and the assistance force (Fu) and a quotient of the total force (Fg) and of the assistance force (Fu).

3. The control device (10) as claimed in claim 2, wherein the evaluation device (36) is configured to define a probable driver braking force (Ff) which is equal to the difference between the total force (Fg) and the assistance force (Fu) as at least part of the third information item.

4. The control device (10) as claimed in claim 3, wherein the evaluation device (36) is configured to define a setpoint assistance force (Fu0) taking into account the difference between the total force (Fg) and the assistance force (Fu) and/or the probable driver braking force (Ff) as at least part of the third information item.

5. The control device (10) as claimed in claim 3, wherein the evaluation device (36) is configured to define a setpoint assistance force (Fu0) taking into account the difference between the probable driver braking force (Ff) as at least part of the third information item.

6. The control device (10) as claimed in claim 2, wherein the evaluation device (36) is configured to define a setpoint assistance force (Fu0) taking into account the difference between the total force (Fg) and the assistance force (Fu).

7. The control device (10) as claimed in claim 1, wherein the evaluation device (36) is configured to compare the proportional relationship between the total force (Fg) and the assistance force (Fu) with at least one setpoint proportional relationship (60) and to define a corresponding comparison information item as at least part of the third information item.

8. The control device (10) as claimed in claim 1, wherein the evaluation device (36) is configured to define an additional braking torque ($\Delta p$) taking into account the proportional relationship between the total force (Fg) and the assistance force (Fu) as at least part of the third information item, and wherein the output device (44, 50) is configured to actuate, by means of the at least one control signal (46, 52), at least one brake component as at least one component (14, 54) of the booster brake system in such a way that a total braking torque of the booster brake system can be increased by an amount equal to the additional braking torque ($\Delta p$).

9. The control device (10) as claimed in claim 1, wherein the output device (44, 50) is configured to supply the at least one control signal (46, 52) to a brake booster (14), to a device (54) for outputting warnings and/or information, to a fault memory, to a transmitting unit, to an electric parking brake and/or a brake control system as the at least one component (14, 54) of the booster brake system.

10. A booster brake system having a control device (10) as claimed in claim 1.

11. A vehicle having a booster brake system as claimed in claim 10.

12. The control device (10) as claimed in claim 1, wherein the evaluation device (36) is configured to define, as at least part of the third information item, a difference between the total force (Fg) and the assistance force (Fu).

13. The control device (10) as claimed in claim 1, wherein the evaluation device (36) is configured to define, as at least part of the third information item, a quotient of the total force (Fg) and of the assistance force (Fu).

14. A control device (70) for a booster brake system of a vehicle, comprising:
   an input device (72) which is configured to receive a supplied variable (Fu) relating to a supplied assistance force (Fu) of a brake booster (14) of the booster brake system;
   an evaluation device (78) which is configured to compare the received variable (Fu) relating to the assistance force (Fu) with a predetermined setpoint variable (Fu0) relating to the assistance force (Fu) and to define an additional braking torque ($\Delta p$) corresponding to a difference ($\Delta F$) between the variable (Fu) and the setpoint variable (Fu0) if said difference ($\Delta F$) is greater than a predefined deviation limit; and
   an output device (82) which is configured to actuate at least one brake component (86) by means of at least one control signal (84) taking into account the defined additional braking torque ($\Delta p$), in such a way that a total braking torque of the booster brake system can be increased by an amount equal to the additional braking torque ($\Delta p$).

15. The control device (70) as claimed in claim 14, wherein the output device (82) is configured to actuate, by means of the at least one control signal (84), an electric actuator, an electromechanical actuator, an electric parking brake and/or a brake control system of the booster brake system as at least one brake component (86) in such a way that a total braking torque of the booster brake system can be increased by an amount equal to the additional braking torque ($\Delta p$).

16. A booster brake system having a control device (70) as claimed in claim 14.

17. A vehicle having a booster brake system as claimed in claim 16.

18. A method for operating a booster brake system of a vehicle, comprising the steps:

determining a first information item (28) relating to a supplied assistance force (Fu) of a brake booster (14) of the booster brake system;

determining by a sensor a second information item (32) relating to a total force (Fg) composed of the assistance force (Fu) and of a driver braking force (Ff) supplied by activating an activation element (10) of the booster brake system;

defining by a control device a third information item relating to a proportional relationship between the total force (Fg) and the assistance force (Fu) taking into account the first information item (28) and the second information item (32); and controlling at least one component (14, 54) of the booster brake system taking into account the supplied third information item relating to the proportional relationship between the total force (Fg) and the assistance force (Fu).

19. A method for operating a booster brake system of a vehicle, comprising the steps:

determining a variable (Fu) relating to a supplied assistance force (Fu) of a brake booster (14) of the booster brake system;

comparing by a control device the variable (Fu) relating to the assistance force (Fu) with a predefined setpoint variable (Fu0) relating to the assistance force (Fu);

defining by the control device an additional braking torque ($\Delta p$) corresponding to a difference ($\Delta f$) between the variable (Fu) and the setpoint variable (Fu0) if said difference is greater than a predefined deviation limit; and increasing of a total braking torque of the booster brake system by an amount equal to the additional braking torque ($\Delta p$).

* * * * *